United States Patent
Oh

(10) Patent No.: US 10,585,543 B2
(45) Date of Patent: Mar. 10, 2020

(54) DISPLAY DEVICE FOR SENSING FORCE

(71) Applicant: LG DISPLAY CO., LTD., Seoul (KR)

(72) Inventor: JunSeok Oh, Bucheon-si (KR)

(73) Assignee: LG DISPLAY CO., LTD., Seoul (KR)

(*) Notice: Subject to any disclaimer, the term of this patent is extended or adjusted under 35 U.S.C. 154(b) by 0 days.

(21) Appl. No.: 15/797,559

(22) Filed: Oct. 30, 2017

(65) Prior Publication Data
US 2018/0120983 A1 May 3, 2018

(30) Foreign Application Priority Data
Oct. 31, 2016 (KR) .................... 10-2016-0143181

(51) Int. Cl.
| | |
|---|---|
| *G06F 3/045* | (2006.01) |
| *G06F 3/041* | (2006.01) |
| *G02F 1/1333* | (2006.01) |
| *G02F 1/1339* | (2006.01) |
| *G09G 3/36* | (2006.01) |

(52) U.S. Cl.
CPC .......... *G06F 3/045* (2013.01); *G02F 1/13338* (2013.01); *G02F 1/13394* (2013.01); *G06F 3/0412* (2013.01); *G06F 3/0414* (2013.01); *G09G 3/3677* (2013.01); *G09G 3/3688* (2013.01)

(58) Field of Classification Search
CPC ............. G02F 1/13338; G02F 1/13394; G02F 1/134363; G06F 3/0412; G06F 3/0414; G06F 3/045; G06F 3/047; G09G 3/3677; G09G 3/3688; G09G 3/3648; G09G 2300/0426; G09G 2300/0443; G09G 2300/0465
See application file for complete search history.

(56) References Cited

U.S. PATENT DOCUMENTS

| | | | |
|---|---|---|---|
| 2007/0195029 A1* | 8/2007 | Jeon .................... | G02F 1/13338 345/87 |
| 2011/0181530 A1 | 7/2011 | Park et al. | |
| 2015/0338967 A1 | 11/2015 | Chern et al. | |
| (Continued) | | | |

FOREIGN PATENT DOCUMENTS

| | | |
|---|---|---|
| CN | 102141852 A | 8/2011 |
| EP | 2990913 A1 | 3/2016 |
| (Continued) | | |

*Primary Examiner* — Christopher E Leiby
(74) *Attorney, Agent, or Firm* — Birch, Stewart, Kolasch & Birch, LLP

(57) ABSTRACT

Disclosed is a force sensing display device which sequentially supplies a driving signal to at least two force sensing sensors and senses forces pressing the force sensing sensors by using sensing signals sequentially received from the force sensing sensors. The force sensing display device includes a panel including a plurality of gate lines and a plurality of data lines, a gate driver driving the plurality of gate lines, a data driver driving the plurality of data lines, a controller controlling the gate driver and the data driver, a force sensing panel disposed adjacent to the panel and including at least two force sensing sensors, and a force sensing unit sequentially supplying a driving signal to the at least two force sensing sensors and sensing forces respectively pressing the at least two force sensing sensors by using sensing signals sequentially received from the force sensing panel.

16 Claims, 4 Drawing Sheets

(56) References Cited

U.S. PATENT DOCUMENTS

| | | |
|---|---|---|
| 2016/0062504 A1 | 3/2016 | Hwang et al. |
| 2016/0188050 A1 | 6/2016 | Uchiyama |
| 2017/0010730 A1 | 1/2017 | Chuang et al. |
| 2017/0045989 A1 | 2/2017 | Lee et al. |
| 2017/0285832 A1* | 10/2017 | Lee ........................ G06F 3/0414 |

FOREIGN PATENT DOCUMENTS

| | | |
|---|---|---|
| TW | 201635117 A | 10/2016 |
| TW | M529885 U | 10/2016 |
| TW | M530432 U | 10/2016 |

* cited by examiner

DISPLAY DEVICE FOR SENSING FORCE

CROSS-REFERENCE TO RELATED APPLICATIONS

This application claims the priority benefit of the Korean Patent Application No. 10-2016-0143181 filed on Oct. 31, 2016, which is hereby incorporated by reference in its entirety into the present application.

BACKGROUND

Field of the Invention

The present disclosure relates to a display device for sensing force.

Discussion of the Related Art

Flat panel display (FPD) devices are applied to various kinds of electronic products such as portable phones, tablet personal computers (PCs), notebook PCs, etc. Examples of the FPD devices (hereinafter simply referred to as a display device) include liquid crystal display (LCD) devices, organic light emitting diode (OLED) display devices, etc. Recently, electrophoretic display devices (EPDs) are being widely used as a type of FPD device.

The display devices may include a touch panel for sensing a user touch position. Recently, the display devices include a force sensing panel for sensing a touch position and a force of a touch.

FIG. 1 is a diagram illustrating a configuration of a related art force sensing display device including a force sensing panel.

Force sensing panels may be categorized into capacitive force sensing panels using a variation of a capacitance and resistive force sensing panels using a variation of a resistance. In FIG. 1, the force sensing display device including a resistive force sensing panel is illustrated. In FIG. 1, the force sensing display device including four force sensing sensors P1 to P4 is illustrated.

In the related art force sensing display device, a driver 20 simultaneously transmits a driving signal to the force sensing sensors P1 to P4. A receiver 30 sequentially receives sensing signals transmitted from the force sensing sensors P1 to P4 to sense a force applied to each of the force sensing sensors P1 to P4.

To this end, in the related art force sensing display device, as illustrated in FIG. 1, the force sensing sensors P1 to P4 are connected to the driver 20 through one line.

Therefore, when a touch is sensed by a first force sensing sensor P1, the driving signal is supplied to a second force sensing sensor P2, a third force sensing sensor P3, and a fourth force sensing sensor P4 as well as the first force sensing sensor P1. Therefore, a first sensing signal received from the first force sensing sensor P1 is affected by the driving signal supplied to the second force sensing sensor P2, the third force sensing sensor P3, and the fourth force sensing sensor P4. Therefore, a sensitivity of the first sensing signal transmitted from the first force sensing sensor P1 is reduced, and thus, a force occurring in the first force sensing sensor P1 is not accurately calculated.

To provide an additional description, since the force sensing sensors P1 to P4 are connected to the driver 20 in parallel, each of the force sensing sensors P1 to P4 is affected by a current flowing to the other force sensing sensors, and for this reason, touch sensitivity is reduced.

Moreover, in the related art force sensing display device, as illustrated in FIG. 1, load resistors LR1 to LR4 are respectively connected between the force sensing sensors P1 to P4 and a ground.

For this reason, due to the load resistors LR1 to LR4, a configuration of the force sensing display device becomes complicated, a process of manufacturing the display device becomes difficult, and the manufacturing cost of the display device increases.

SUMMARY

Accordingly, the present disclosure is directed to provide a display device for sensing force that substantially obviates one or more problems due to limitations and disadvantages of the related art.

An aspect of the present disclosure is directed to provide a force sensing display device which sequentially supplies a driving signal to at least two force sensing sensors and senses forces that are pressing the force sensing sensors by using sensing signals sequentially received from the force sensing sensors.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a force sensing display device including a panel including a plurality of gate lines and a plurality of data lines, a gate driver driving the plurality of gate lines, a data driver driving the plurality of data lines, a controller controlling the gate driver and the data driver, a force sensing panel disposed adjacent to the panel and including at least two force sensing sensors, and a force sensing unit sequentially supplying a driving signal to the at least two force sensing sensors and sensing forces respectively pressing the at least two force sensing sensors by using sensing signals sequentially received from the force sensing panel.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Figure 1:
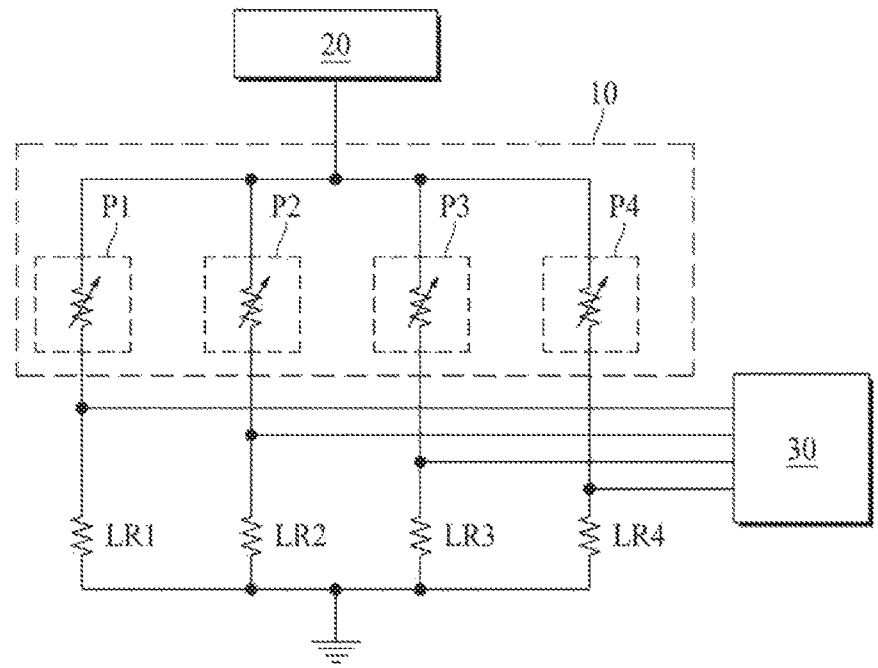
FIG. 1 is a diagram illustrating a configuration of a related art force sensing display device including a force sensing panel.

Reference will now be made in detail to the exemplary embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

In the specification, in adding reference numerals for elements in each drawing, it should be noted that like reference numerals already used to denote like elements in other drawings are used for elements wherever possible.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when a position relation between two parts is described as 'on~', 'over~', 'under~', and 'next~', one or more other parts may be disposed between the two parts unless 'just' or 'direct' is used.

In describing a time relationship, for example, when the temporal order is described as 'after~', 'subsequent~', 'next~', and 'before~', a case which is not continuous may be included unless 'just' or 'direct' is used.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item. Further, the term "may" fully encompasses all the meanings of the term "can."

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of the present disclosure will be described in detail with reference to the accompanying drawings. The present disclosure may be applied to various kinds of display devices using external compensation. Hereinafter, for convenience of description, an organic light emitting display device will be described as an example of the present disclosure.

Figure 2:
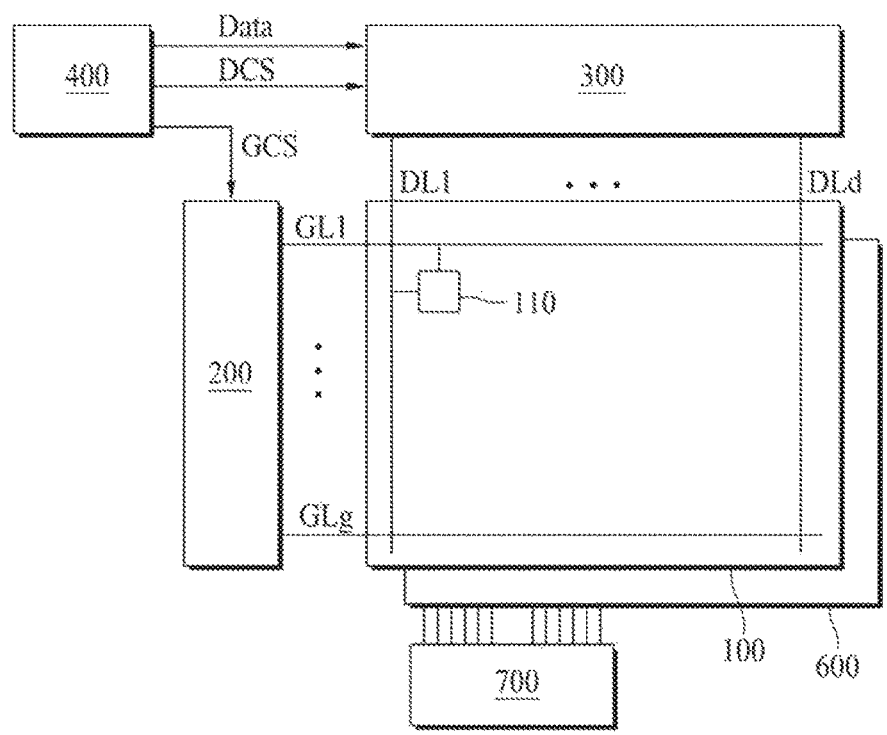
FIG. 2 is an exemplary diagram illustrating a configuration of a force sensing display device according to an embodiment of the present disclosure.

FIG. 2 is an exemplary diagram illustrating a configuration of a force sensing display device according to an embodiment of the present disclosure. All the components of the force sensing display device according to all embodiments of the present disclosure are operatively coupled and configured.

The force sensing display device according to an embodiment of the present disclosure, as illustrated in FIG. 2, may include a panel 100 which includes a plurality of gate lines GL1 to GLg and a plurality of data lines DL1 to DLd, a gate driver 200 which drives the gate lines GL1 to GLg, a data driver 300 which drives the data lines DL1 to DLd, a controller 400 which controls the gate driver 200 and the data driver 300, a force sensing panel 600 which is disposed adjacent to the panel 100 and includes at least two force sensing sensors, and a force sensing unit 700 which sequentially supplies a driving signal to the force sensing sensors and senses forces pressing the force sensing sensors by using sensing signals sequentially received from the force sensing panel 600.

The gate lines GL1 to GLg, the data lines DL1 to DLd, and a plurality of pixels 110 may be included in the panel 100.

A structure of each of the pixels 110 may be variously modified depending on a kind of the display device.

For example, when the display device is an organic light emitting display device, each of the pixels 110 may include an organic light emitting diode (OLED), a switching transistor which is connected to a data line and a gate line, and a driving transistor which is connected to the switching transistor to control a current flowing to the OLED.

When the display device is an LCD device, each of the pixels 110 may include a liquid crystal, a pixel electrode, and a switching transistor. The switching transistor may be connected to the gate line, the data line, and the pixel electrode.

The gate driver 200 may sequentially generate a gate pulse according to a gate control signal GCS supplied from the controller 400 and may sequentially supply the gate pulse to the gate lines GL1 to GLg.

The gate driver 200 may be directly provided in the panel 100 in performing a process of forming a thin film transistor (TFT) of each pixel 100, or may be implemented as an integrated circuit (IC) type and may be equipped in the panel 100. A type where the gate driver 200 is directly provided in the panel 100 may be referred to as a gate-in panel (GIP) type.

The data driver 300 may be connected to the data lines DL1 to DLd. The data driver 300 may convert digital image data Data, transferred from the controller 400, into analog data voltages and may respectively supply the data voltages for one horizontal line to the data lines DL1 to DLd at every period where the gate pulse is supplied to one gate line.

The data driver 300 may convert the image data Data into the data voltages by using gamma voltages supplied from a gamma voltage generator and may respectively supply the data voltages to the data lines. The data driver 300 may be implemented as one IC along with the controller 400.

The controller 400 may control the gate driver 200 and the data driver 300. The controller 400 may convert input video data transferred from an external system 900 into the image data Data suitable for a structure of the panel 100 and may transfer the image data Data to the data driver 300.

The controller 400 may generate the gate control signal GCS for controlling the gate driver 200 and a data control signal DCS for controlling the data driver 300 and may respectively transfer the gate control signal GCS and the data control signal DCS to the gate driver 200 and the data driver 300.

The force sensing panel 600 may be disposed adjacent to the panel 100 and may include at least two force sensing sensors.

For example, the force sensing panel 600 may be disposed on an upper end of the panel 100, or may be disposed under a lower end of the panel 100.

In a case where a touch panel for sensing a touch position is provided on the upper end of the panel 100, the force sensing panel 600 may be disposed on an upper end of the touch panel.

When the touch panel is built into the panel 100, the force sensing panel 600 may be disposed on the upper end or the lower end of the panel 100.

Moreover, when the panel 100 is a liquid crystal display panel, the force sensing panel 600 may be provided on an upper end or a lower end of a backlight unit disposed under a lower end of the liquid crystal display panel, for irradiating light onto the liquid crystal display panel.

The force sensing unit 700 may sequentially supply the driving signal to the force sensing sensors and may sense the forces pressing the force sensing sensors by using the sensing signals sequentially received from the force sensing panel 600.

The force sensing unit 700 may be configured as an IC along with at least one of the data driver 300, the gate driver 200, and the controller 400, or may be configured independently from the data driver 300, the gate driver 200, and the controller 400.

The force sensing display device according to an embodiment of the present disclosure, as described above, may include a touch panel which is disposed on the upper end of the panel 100 or is built into the panel 100 and senses a touch position. In this case, the force sensing display device may include a touch sensing unit for driving the touch panel. The touch sensing unit may be configured as an IC along with the force sensing unit 700.

Figure 3:
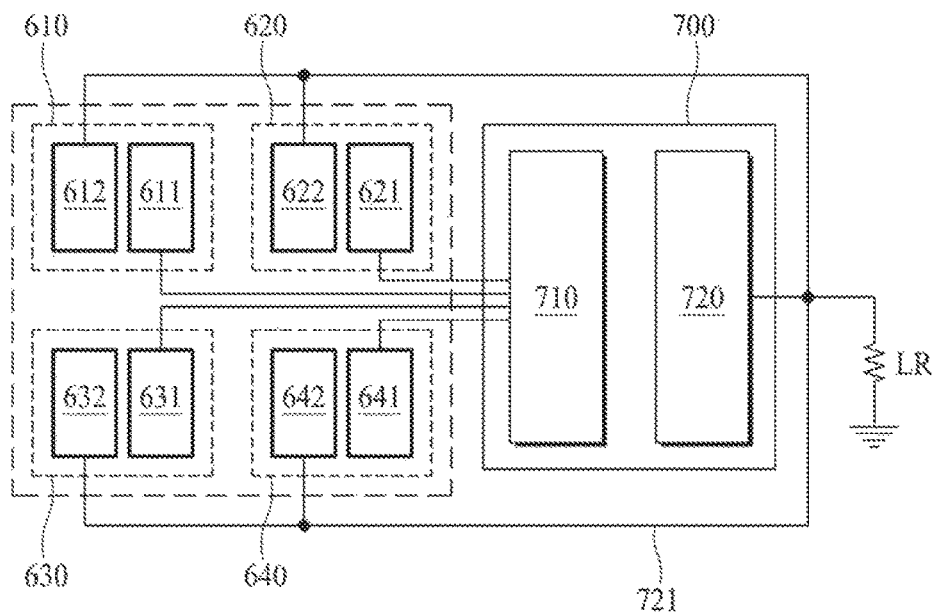
FIG. 3 is a plan view schematically illustrating a force sensing panel and a force sensing unit applied to a force sensing display device according to an embodiment of the present disclosure.
Figure 4:
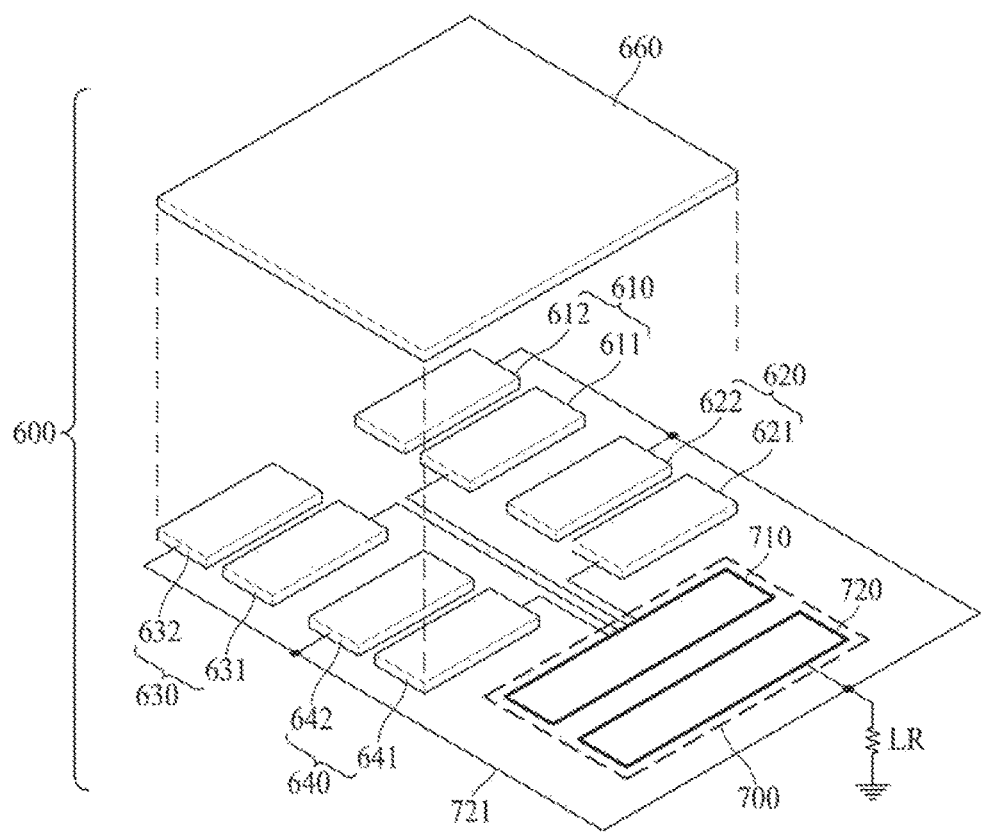
FIG. 4 is a perspective view schematically illustrating a force sensing panel and a force sensing unit applied to a force sensing display device according to an embodiment of the present disclosure.
Figure 5:
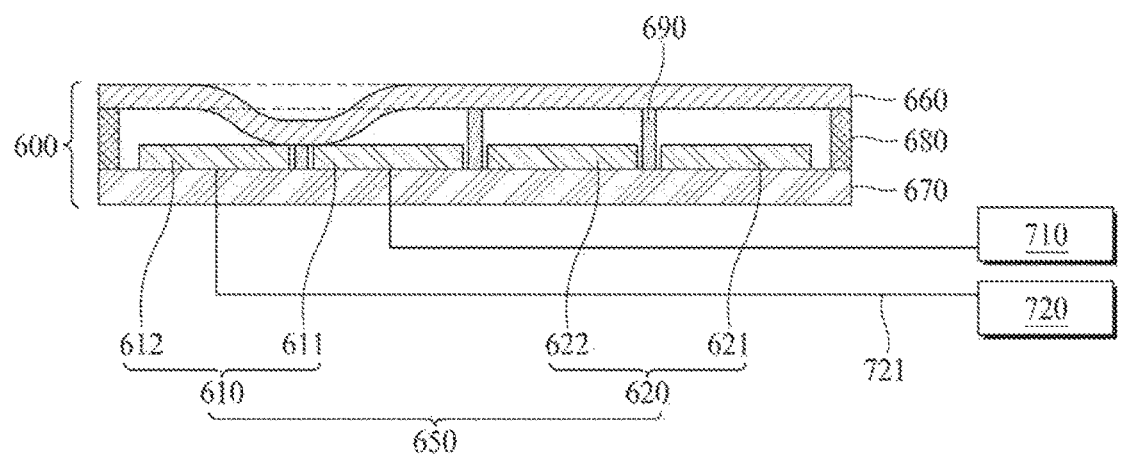
FIG. 5 is a cross-sectional view illustrating a cross-sectional surface of a force sensing panel applied to a force sensing display device according to an embodiment of the present disclosure.

FIG. 3 is a plan view schematically illustrating a force sensing panel 600 and a force sensing unit applied to a force sensing display device according to an embodiment of the present disclosure. FIG. 4 is a perspective view schematically illustrating the force sensing panel 600 and the force sensing unit applied to the force sensing display device according to an embodiment of the present disclosure. FIG. 5 is a cross-sectional view illustrating a cross-sectional surface of the force sensing panel 600 applied to the force sensing display device according to an embodiment of the present disclosure. In FIGS. 3 to 5, the force sensing panel 600 including four force sensing sensors is illustrated only as an example and the present disclosure is not limited thereto. Hereinafter, therefore, the force sensing display device including the force sensing panel 600 including the four force sensing sensors will be described as an example of the present disclosure.

The force sensing panel 600, as illustrated in FIG. 5, may include a base substrate 670, a sensing unit 650 which is included in the base substrate 670 and includes a plurality of force sensing sensors 610, 620, 630, and 640, an electrode unit 660 which covers the force sensing sensors 610, 620, 630, and 640 and is a conductor, a spacer 690 which is provided as a dot type between the base substrate 670 and the electrode unit 660 to have an elastic force and maintains a constant interval between the sensing unit 650 and the electrode unit 670, and a sealant 680 which is provided outside the base substrate 670 and the electrode unit 660 and seals a space between the base substrate 670 and the electrode unit 660.

The base substrate 670 may be a glass substrate, a plastic substrate, or the like. The base substrate 670 may include a transparent material or an opaque material.

The electrode unit 660 may cover the force sensing sensors 610, 620, 630, and 640. The electrode unit 660 may include metal having a high resistance. The electrode unit 660 may include a transparent electrode provided on the glass substrate or the plastic substrate. The electrode unit 660 may have an elastic force.

Therefore, when the electrode unit 660 is pressed by a finger of a person or a touching stick, as illustrated in FIG. 5, a pressed portion of the electrode unit 660 may contact at least one of the force sensing sensors 610, 620, 630, and 640. In FIG. 5, the pressed portion of the electrode unit 660 may contact a first force sensing sensor 610.

The spacer 690 may be formed of a material having an elastic force. For example, the spacer 690 may be formed of a material which forms a spacer for maintaining a gap between an upper substrate and a lower substrate which configure a liquid crystal display panel. In addition, the spacer 690 may be formed of one of materials having an elastic force among insulators.

The spacer 690 may be provided as a dot type between the base substrate 670 and the electrode unit 660 and may maintain a constant interval between the sensing unit 650 and the electrode unit 660. The spacer 690 may be provided as one or more.

In a case where the force sensing sensors 610, 620, 630, and 640 are respectively configured with a plurality of driving electrodes 611, 621, 631, and 641 and a plurality of reception electrodes 612, 622, 632, and 642, the spacers 690 may be respectively disposed between the driving electrode 611 and the reception electrode 612, between the driving electrode 621 and the reception electrode 622, between the driving electrode 631 and the reception electrode 632, and between the driving electrode 641 and the reception electrode 642.

The sealant 680 may be provided outside the base substrate 670 and the electrode unit 660 and may seal the space between the base substrate 670 and the electrode unit 660.

The sealant 680 may use a sealant for sealing the upper substrate and the lower substrate of the liquid crystal display panel. The sensing unit 650 may be included in the base substrate 670 and may be configured with the force sensing sensors 610, 620, 630, and 640.

The force sensing sensors 610, 620, 630, and 640 may respectively include the driving electrodes 611, 621, 631, and 641 connected to the driver 710 in a one-to-one relationship and the reception electrodes 612, 622, 632, and 642 connected to a receiver 720.

The driving electrodes 611, 621, 631, and 641 respectively configuring the force sensing sensors 610, 620, 630, and 640 may be connected to the driver 710 in a one-to-one relationship. Therefore, a driving signal may be individually supplied to each of the driving electrodes 611, 621, 631, and 641.

Therefore, each of the driving electrodes is not affected by the driving signal supplied to the other driving electrodes.

To provide an additional description, in an embodiment of the present disclosure, each of the force sensing sensors 610, 620, 630, and 640 is not affected by the other force sensing sensors. In an embodiment of the present disclosure, since the force sensing sensors 610, 620, 630, and 640 are connected to the driver 710 in a one-to-one relationship, an influence of a current between the force sensing sensors 610, 620, 630, and 640 is reduced or removed. Accordingly, noise which is caused by a current and is included in raw data received from each of the force sensing sensors 610, 620, 630, and 640 is reduced.

The reception electrodes 612, 622, 632, 642 respectively configuring the force sensing sensors 610, 620, 630, and 640 may be connected to the receiver 720 through a reception line 721 in common.

At least one load resistor LR may be connected to the reception line 721. The load resistor LR may maintain a resistance variation or voltage variation of each of the force sensing sensors 610, 620, 630, and 640 at a constant level.

In an embodiment of the present disclosure, the load resistor LR included in the reception line 721 can affect all of the force sensing sensors 610, 620, 630, and 640.

Therefore, in comparison with the related art force sensing display device where load resistors are respectively connected to force sensing sensors, the force sensing display device according to an embodiment of the present disclosure may include a smaller number of load resistors. Accordingly, according to an embodiment of the present disclosure, a circuit is simplified, a manufacturing process is simplified, and the manufacturing cost is reduced.

The force sensing unit 700 may include the driver 710, which sequentially supplies the driving signal to the force sensing sensors 610, 620, 630, and 640, and the receiver 720 which senses forces pressing the force sensing sensors 610, 620, 630, and 640 by using sensing signals sequentially received from the force sensing sensors 610, 620, 630, and 640.

As described above, the driver 710 may be connected to the driving electrodes 611, 621, 631, and 641 in a one-to-one relationship, and the receiver 720 may be connected to the reception electrodes 612, 622, 632, and 642 through one the reception line 721.

Figure 6:
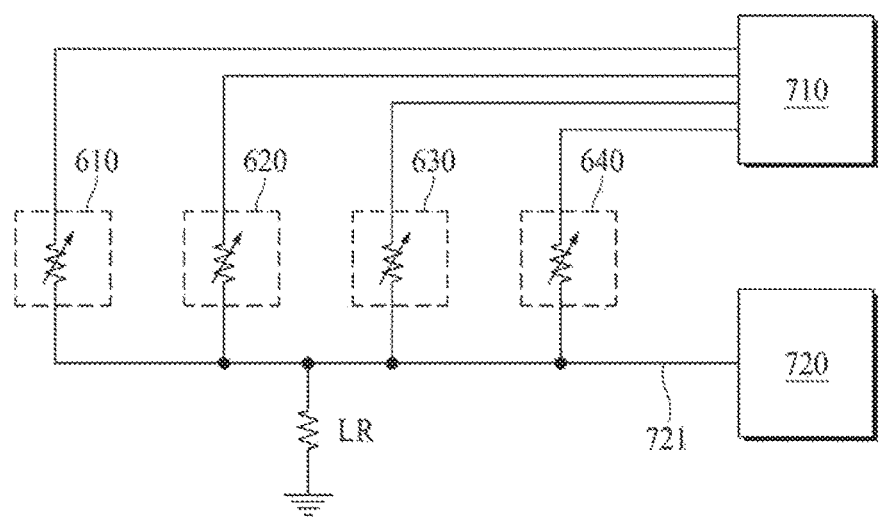
FIG. 6 is an equivalent circuit illustrating a connection relationship between a force sensing panel and a force sensing unit applied to a force sensing display device according to an embodiment of the present disclosure.

FIG. 6 is an equivalent circuit illustrating a connection relationship between a force sensing panel and a force sensing unit applied to a force sensing display device according to an embodiment of the present disclosure. Hereinafter, a driving method of a force sensing display device according to an embodiment of the present disclosure will be described with reference to FIGS. 3 to 6. In the following description, details which are the same as or similar to the details described above with reference to FIGS. 2 to 5 are omitted or will be briefly described.

The driver 710 may sequentially supply the driving signal to the driving electrodes 611, 621, 631, and 641.

As illustrated in FIG. 5, when the electrode unit 660 is pressed and contacts the first force sensing sensor 610, a first driving electrode 611 and a first reception electrode 612 configuring the first force sensing sensor 610 may be physically connected to each other by the electrode unit 660.

In a state where the first driving electrode 611 and the first reception electrode 612 are physically connected to each other by the electrode unit 660, when the driving signal is supplied to the first driving electrode 611, the driving signal may be supplied to the first reception electrode 612 through the electrode unit 660.

Therefore, a first sensing signal may be transferred from the first reception electrode 612 to the receiver 720.

In this case, due to a force pressing the electrode unit 660, an area where the electrode unit 660 contacts each of the first driving electrode 611 and the first reception electrode 612 can vary. A resistance of the first force sensing sensor 610 varies based on the area.

Therefore, the first force sensing sensor 610 may perform a function of a variable resistor.

The receiver 720 may analyze the first sensing signal received through the reception line 721 to calculate a level of a force pressing the first force sensing sensor 610.

As described above, the first force sensing sensor 610 may perform a function of a variable resistor. Accordingly, the receiver 720 may calculate the level of the force pressing the first force sensing sensor 610, based on a variation of a resistance of the first force sensing sensor 610.

Since the driver 710 sequentially supplies the driving signal to the driving electrodes 611, 621, 631, and 641, the receiver 720 may sequentially receive sensing signals from the reception electrodes 612, 622, 632, and 642. Accordingly, the receiver 720 may sequentially calculate forces pressing the force sensing sensors 610, 620, 630, and 640.

Figure 7:
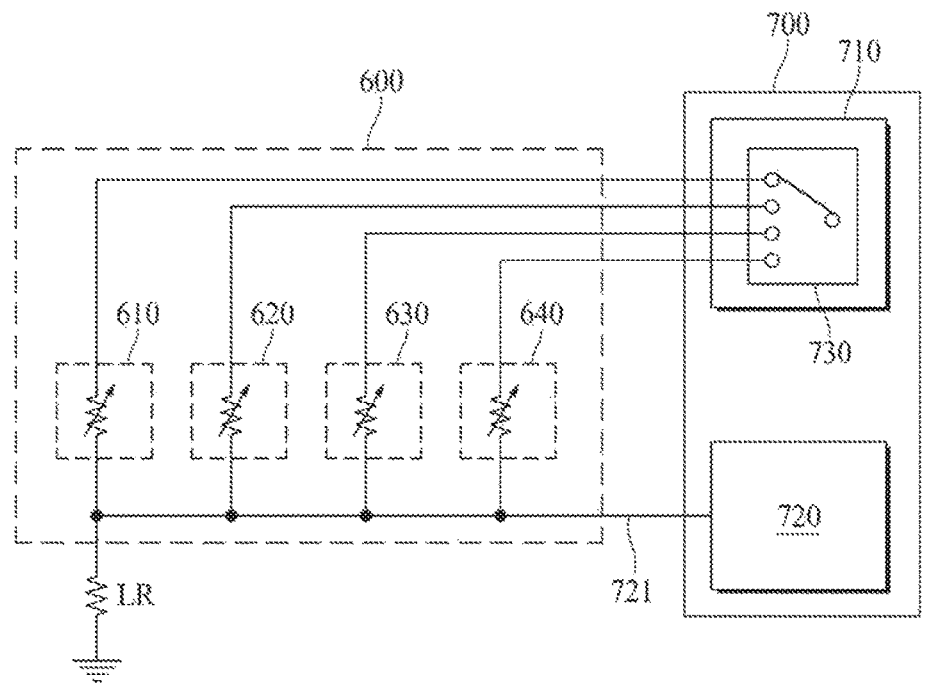
FIG. 7 is an exemplary diagram illustrating a configuration of a force sensing unit applied to a force sensing display device according to an embodiment of the present disclosure.
Figure 8:
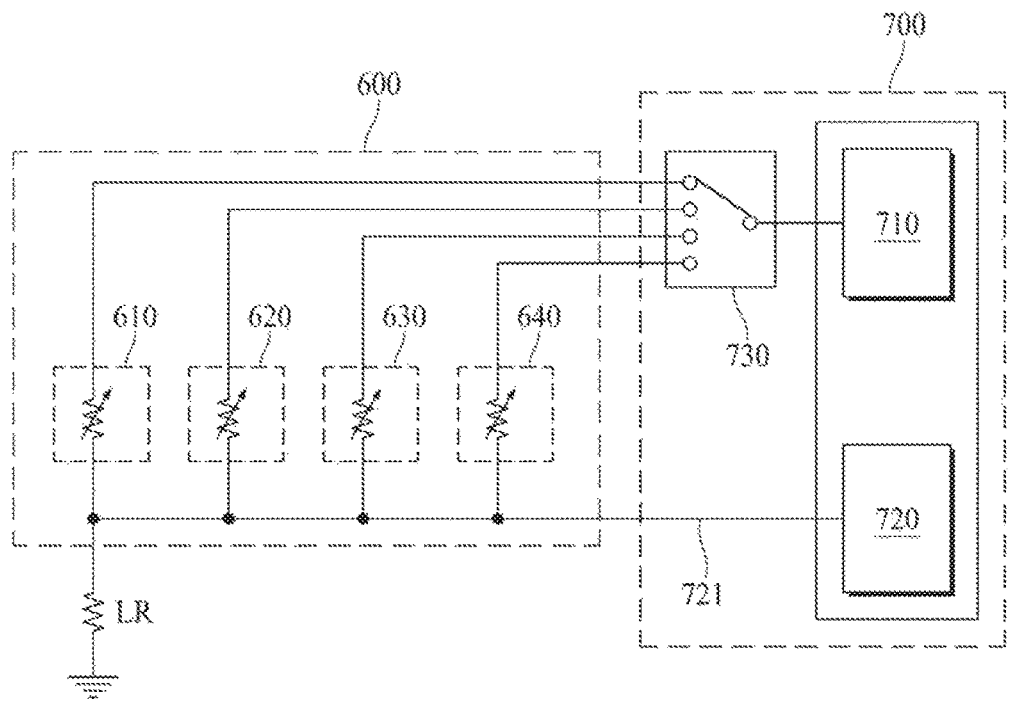
FIG. 8 is another exemplary diagram illustrating a configuration of a force sensing unit applied to a force sensing display device according to an embodiment of the present disclosure.

FIG. 7 is an exemplary diagram illustrating a configuration of a force sensing unit applied to a force sensing display device according to an embodiment of the present disclosure, and FIG. 8 is another exemplary diagram illustrating a configuration of a force sensing unit applied to a force sensing display device according to an embodiment of the present disclosure.

As described above, a force sensing unit 700 may include a driver 710, which sequentially supplies a driving signal to the force sensing sensors 610, 620, 630, and 640, and a receiver 720 which senses forces pressing the force sensing sensors 610, 620, 630, and 640 by using sensing signals sequentially received from the force sensing sensors 610, 620, 630, and 640.

The driver 710 may sequentially supply the driving signal to the driving electrodes 611, 621, 631, and 641 respectively configuring the force sensing sensors 610, 620, 630, and 640.

To this end, as illustrated in FIG. 7, the driver 710 may include a switching unit 730.

The switching unit 730 may be sequentially connected to the driving electrodes 611, 621, 631, and 641 according to control by the driver 710. Therefore, the driving signal supplied from the driver 710 may be sequentially supplied to the driving electrodes 611, 621, 631, and 641 through the switching unit 730.

The driver 710 including the switching unit 730 and the receiver 720 may be configured as one IC as illustrated in FIG. 7.

On the other hand, as illustrated in FIG. 8, only the driver 710 and the receiver 720 may be configured as one IC, and the switching unit 730 may be separately configured as an analog circuit.

For example, if the force sensing unit 700 configured as one IC as illustrated in FIG. 7 cannot perform a function (i.e., a floating function) of sequentially supplying the driving signal to the driving electrodes 611, 621, 631, and 641, as illustrated in FIG. 8, only the driver 710 for generating the driving signal and the receiver 720 may be configured as one IC, and the switching unit 730 for performing the floating function may be separately configured as an analog circuit.

In this case, the switching unit 730 may be sequentially connected to the driving electrodes 611, 621, 631, and 641 according to control by the driver 710 and may sequentially supply the driving signal generated by the driver 710 to the driving electrodes 611, 621, 631, and 641.

As described above, according to the embodiments of the present disclosure, the driver may be connected to the driving electrodes respectively configuring the force sensing sensors in a one-to-one relationship, and the driving signal may be sequentially supplied to the driving electrodes. Therefore, one force sensing sensor is not affected by the other force sensing sensors. Accordingly, a sensitivity of a sensing signal received from each force sensing sensor is enhanced, and thus, a force pressing each force sensing sensor is accurately determined.

Moreover, according to the embodiments of the present disclosure, since the reception electrodes respectively configuring the force sensing sensors are connected to the receiver in common, a load resistor may be connected to the reception electrodes in common. Therefore, in comparison with the related art, the number of load resistors is reduced. Accordingly, a configuration of the display device is simplified, a process of manufacturing the display device is simplified, and the manufacturing cost of the display device is reduced.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A force sensing display device comprising:
   a panel including a plurality of gate lines and a plurality of data lines;
   a gate driver driving the plurality of gate lines;
   a data driver driving the plurality of data lines;
   a controller controlling the gate driver and the data driver;
   a force sensing panel adjacent to the panel, the force sensing panel including at least two force sensing sensors; and
   a force sensing unit sequentially supplying a driving signal to the at least two force sensing sensors and sensing forces respectively pressing the at least two force sensing sensors by using sensing signals sequentially received from the force sensing panel,
   wherein:
   each of the at least two force sensing sensors comprises:
      a driving electrode individually connected to a driver in a one-to-one relationship; and
      a reception electrode connected to a receiver, and
   a plurality of reception electrodes respectively configuring the at least two force sensing sensors are connected to the receiver in a many-to-one relationship through a reception line in common,
   wherein the reception line includes four corners, and
   wherein the force sensing unit and the at least two force sensing sensors are disposed inside of the four corners of the reception line.

2. The force sensing display device of claim 1, wherein the force sensing panel comprises:
   a sensing unit including the at least two force sensing sensors; and
   an electrode unit covering the at least two force sensing sensors, the electrode unit being a conductor.

3. The force sensing display device of claim 2, wherein the force sensing unit further comprises:
   the driver sequentially supplying the driving signal to the at least two force sensing sensors; and
   the receiver sensing the forces respectively pressing the at least two force sensing sensors by using the sensing signals sequentially received from the at least two force sensing sensors.

4. The force sensing display device of claim 1, wherein at least one load resistor is connected to the reception line.

5. The force sensing display device of claim 2, wherein:
   the sensing unit is provided on a base substrate,
   a spacer having an elastic force is provided as a dot type between the base substrate and the electrode unit, and
   the spacer maintains a constant interval between the sensing unit and the electrode unit.

6. The force sensing display device of claim 2, wherein:
   the force sensing unit comprises:
      the driver generating the driving signal;
      a switching unit sequentially supplying the driving signal to the at least two force sensing sensors; and
      the receiver sensing the forces respectively pressing the at least two force sensing sensors by using the sensing signals sequentially received from the at least two force sensing sensors,
   the driver and the receiver are configured as one integrated circuit, and
   the switching unit is configured as an analog circuit.

7. The force sensing display device of claim 5, wherein the electrode unit is flexible, and
   wherein the electrode unit is configured to electrically connect the at least two force sensing sensors within the sensing unit to each other, in response to the electrode unit being pressed by a user.

8. The force sensing display device of claim 2, wherein the electrode unit includes a transparent electrode.

9. A force sensing display device comprising:
   a display panel including a plurality of gate lines and a plurality of data lines;
   a controller connected to a gate driver and a data driver; and
   a force sensing panel including:
      a plurality of force driving electrodes,
      a plurality of force sensing electrodes, a flexible electrode unit configured to electrically connect at least one of the plurality of force driving electrodes to at least one of the plurality of force sensing electrodes, a force sensing unit connected to the plurality of force driving electrodes and the plurality of force sensing electrodes, and a reception line connected between the force sensing unit and the plurality of force sensing electrodes, wherein the plurality of force driving electrodes are individually connected to the force sensing unit in a one-to-one relationship, wherein the reception line is commonly connected to the plurality of force sensing electrodes in parallel, wherein the reception line includes four corners, and wherein the force sensing unit and at least two force sensing electrodes of the plurality of force sensing electrodes are disposed inside of the four corners of the reception line.

10. The force sensing display device of claim 9, wherein the force sensing unit is configured to:

sequentially supply a driving signal to the plurality of force driving electrodes, and sequentially receive sensing signals from the plurality of force sensing electrodes.

11. The force sensing display device of claim 9, wherein a load resistor is connected between the reception line and ground, and wherein the load resistor is connected to the plurality of force sensing electrodes in common.

12. The force sensing display device of claim 9, wherein the force sensing unit includes a switching unit configured to sequentially connect to each of the plurality of force driving electrodes and supply a force driving signal.

13. A force sensing display device comprising:

a panel including a plurality of gate lines and a plurality of data lines;

a gate driver driving the plurality of gate lines;

a data driver driving the plurality of data lines;

a controller controlling the gate driver and the data driver;

a touch panel configured to sense a touch position of a touch input;

a force sensing panel adjacent to the panel, the force sensing panel including at least two force sensing sensors, the force sensing panel being configured to sense a force of the touch input; and a force sensing unit sequentially supplying a driving signal to the at least two force sensing sensors and sensing forces respectively pressing the at least two force sensing sensors by using sensing signals sequentially received from the force sensing panel, wherein:

each of the at least two force sensing sensors comprises:
  a driving electrode individually connected to a driver in a one-to-one relationship; and
  a reception electrode connected to a receiver, and a plurality of reception electrodes respectively configuring the at least two force sensing sensors are connected to the receiver in a many-to-one relationship through a reception line in common, wherein the plurality of reception electrodes are connected to each other in parallel via the reception line, wherein the reception line is connected between the force sensing unit and the plurality of reception electrodes, wherein the reception line includes four corners, and wherein the force sensing unit and the at least two force sensing sensors are disposed inside of the four corners of the reception line.

14. The force sensing display device of claim 13, wherein the reception line at least partially surrounds the force sensing unit and the at least two force sensing sensors.

15. The force sensing display device of claim 13, wherein the reception line extends along three sides of the force sensing panel.

16. The force sensing display device of claim 13, wherein the force sensing unit is disposed between the reception line and the at least two force sensing sensors.

* * * * *